United States Patent [19]
Stith, Jr.

[11] 3,978,574
[45] Sept. 7, 1976

[54] METHOD OF POSITIONING AND SUPPORTING A MACHINE

[76] Inventor: Morris Randall Stith, Jr., R.R. No. 1 Box 13, Webster, Ky. 40176

[22] Filed: Aug. 26, 1975

[21] Appl. No.: 607,921

[52] U.S. Cl. .................................. 29/407; 29/460; 29/526; 248/19
[51] Int. Cl.² ....................................... B23Q 17/00
[58] Field of Search ............ 29/150, 407, 458, 460, 29/526, 467; 248/19, 23; 52/744

[56] References Cited
UNITED STATES PATENTS

| | | | |
|---|---|---|---|
| 3,036,375 | 5/1962 | Schlosser et al. | 29/467 |
| 3,194,853 | 7/1965 | Weise et al. | 52/744 X |
| 3,604,306 | 8/1969 | Denholm | 248/19 X |
| 3,695,562 | 10/1972 | Daniel | 248/23 |
| 3,804,375 | 4/1974 | Matson | 248/19 X |
| 3,851,626 | 12/1974 | Boyd et al. | 248/19 X |

Primary Examiner—Charlie T. Moon
Attorney, Agent, or Firm—Koenig, Senniger, Powers and Leavitt

[57] ABSTRACT

A method or system of positioning and supporting a large industrial machine or other object on its foundation comprising placing hydraulic jacking units between the machine and the foundation, pressurizing the jacking units with a hardenable liquid to move the object relative to the foundation to a selected position, maintaining the liquid in the jacking units under pressure so as to support the machine in its selected position, and effecting the hardening of the liquid to fix the jacking units in their selected positions. Apparatus for carrying out the method of this invention is also disclosed.

11 Claims, 6 Drawing Figures

METHOD OF POSITIONING AND SUPPORTING A MACHINE

BACKGROUND OF THE INVENTION

This invention relates to a method of and apparatus for positioning and supporting an object, such as heavy mechanical equipment or a large stationary machine.

Large stationary machines, such as air compressors, components of a rolling mill, or other industrial equipment, must be rigidly secured to their foundations and in many instances must be accurately positioned relative to other equipment. Typically, these large machines are mounted on reinforced concrete foundations and are accurately positioned thereon by means of jack screws or the like. With the machine supported in its desired position, precision-machined shims are installed between the support points or pads of the machine and the foundation so that the machine is accurately positioned and supported in its selected position. These precision-machined shims are costly and time-consuming to manufacture and install. With the machine supported on the shims, grouting mix, such as an aggregate-containing epoxy resin or the like, is poured between the machine base and the foundation. After the grouting mix has hardened, anchor bolts are tightened to secure the machine to the foundation and prevent any upward or lateral movement.

Typically, machinery which is mounted in the above-described manner operates continuously and is subject to vibrational and other cyclic loading. Over a period of time, this loading may cause the grouting beneath the machine to degrade and deteriorate so that the machine must be periodically reset on its foundation. With conventional machine mounting systems, the machine must be removed from its foundation and the grouting mix chipped away. The machine is then repositioned, reshimmed, regrouted and rebolted to the foundation. This resetting procedure is costly and frequently entails several weeks' time during which the machine is out of operation or "down". This may require shutdown of an entire plant or a product line with consequent great loss of revenue.

Adjustable machine supports, such as shown in U.S. Pat. No. 3,695,562, are known which use steel balls within a piston and cylinder arrangement to support a machine. However, these adjustable machine supports, particularly where access to the support is limited, may be difficult to adjust for accurate positioning of the machine. Also, systems, such as shown in U.S. Pat. No. 3,194,853, are known in which an epoxy resin is injected into voids in the grouting beneath a machine base to fill the voids.

SUMMARY OF THE INVENTION

Among the several objects of this invention may be noted the provision of a system or method of setting or resetting a heavy machine or the like on its foundation in which a plurality of support points of the machine may be readily and accurately adjusted so as to precisely position the machine in a desired position; the provision of such a system which does not require that the machine be removed from its foundation for resetting of the machine; the provision of such a system which solidly supports the machine in its desired position; the provision of such a system which substantially reduces the cost and the downtime required to mount or to reset a machine; and the provision of a hydraulic jacking unit which enables a heavy machine to be accurately positioned and which solidly supports the machine in its desired position. Other objects and features of this invention will be in part apparent and in part pointed out hereinafter.

Briefly, the method of this invention for positioning and supporting an object, such as a large machine or other structure, on a foundation comprises the steps of placing a plurality of hydraulic jack units between the foundation and the object, and introducing a liquid under pressure into each of the jacking units to move the object relative to the foundation to a selected position. This liquid constitutes a hydraulic working fluid and is hardenable to form a solid substantially without expanding or contracting as it hardens. The system further includes the steps of maintaining the liquid in each of the jacking units under pressure so as to support the object in its selected position, and effecting the hardening of the liquid maintained in each of the jacking units to fix the jacking units in their respective positions with the object supported in its selected position.

A jacking unit of the present invention comprises a cylinder and piston defining an expansible chamber having opposed cylinder and piston faces for receiving a pressurized, hardenable liquid, such as an epoxy resin mixed with a suitable hardener or catalyst, for relative extension of the cylinder and piston. The piston face protrudes outwardly beyond the body of the piston with the outermost protruding portion of the piston face being at the center thereof. The cylinder face has a pocket therein in line with the outermost portion of piston face, the latter being surrounded by a space for liquid when the cylinder and piston faces are relatively retracted, this space constituting a portion of the chamber. The jack further has an inlet for the flow of the liquid into the space and an outlet extending from the pocket for exit of air from the chamber as the liquid enters the space, and means for closing the inlet and the outlet whereby with the cylinder and piston pressurized by the liquid and with the cylinder and piston in a selected relatively extended position the closing means is operable to entrap the liquid within the chamber to hold the cylinder and piston at their stated extended position and to permit the liquid to harden thereby to fix the cylinder and piston in their stated extended position.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
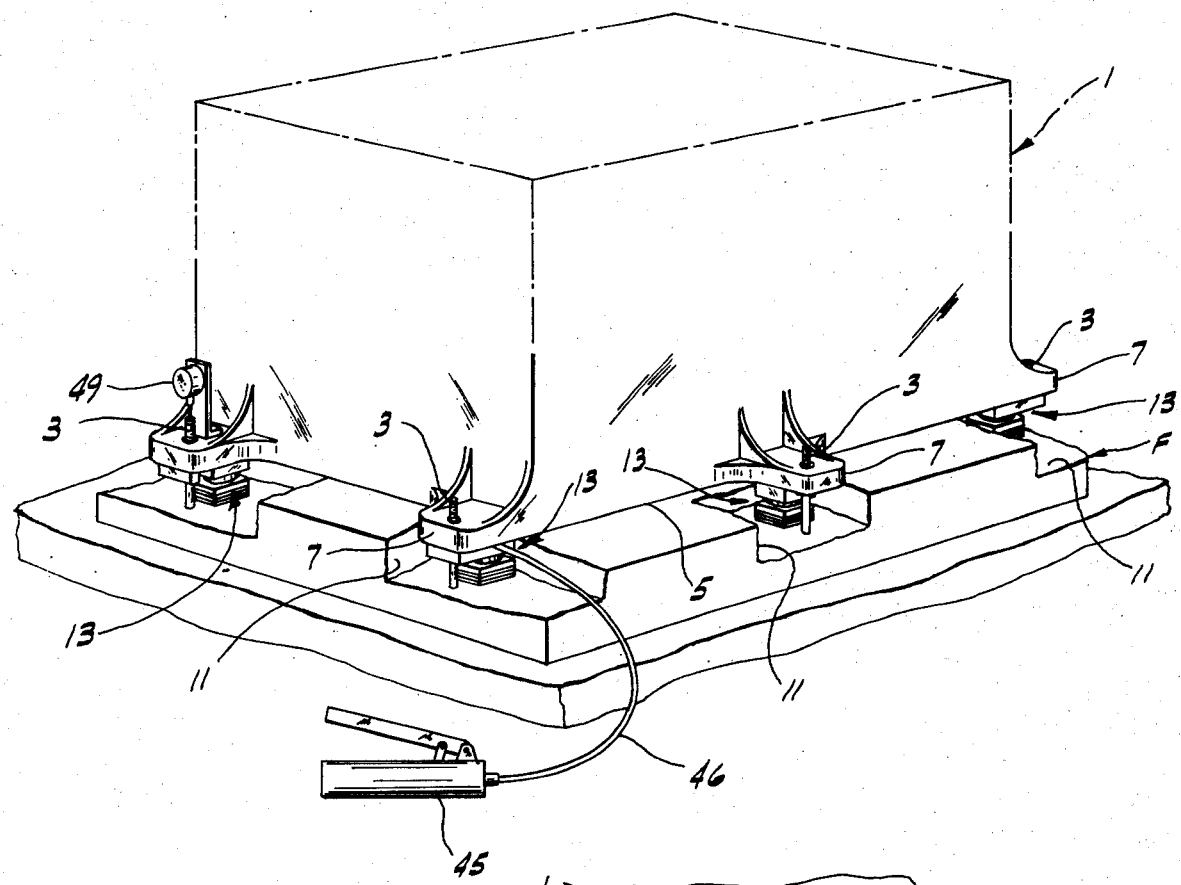
FIG. 1 is a perspective view of an object or a machine which is to be accurately positioned on its foundation by the method of the present invention.
Figure 2:
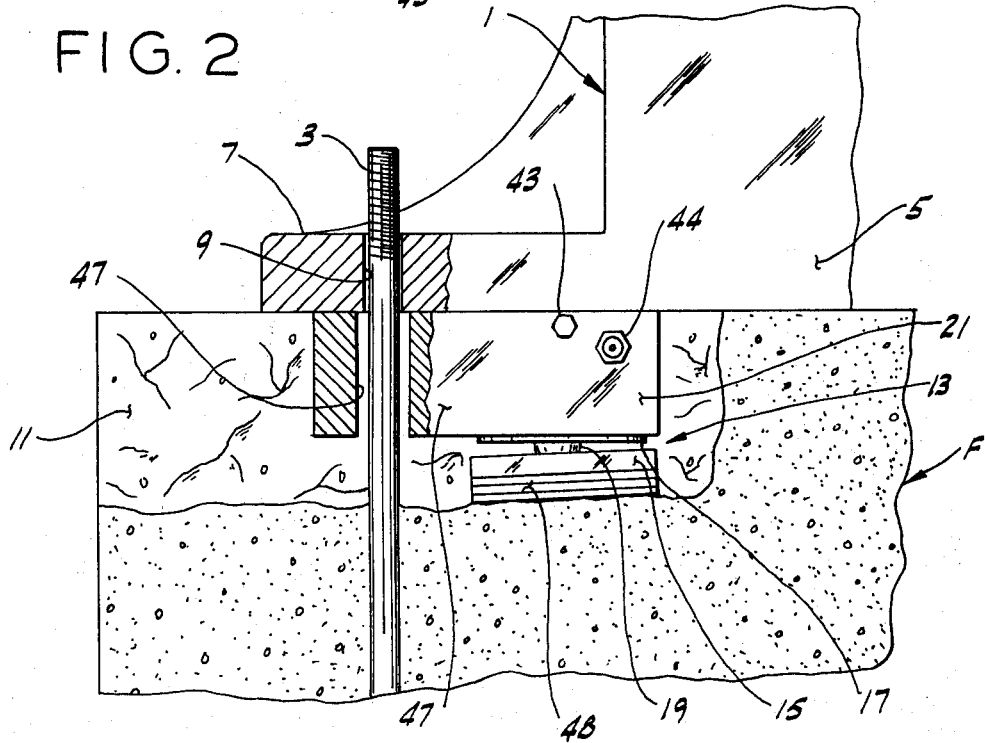
FIG. 2 illustrates a pocket or recess formed in the foundation below a mounting flange on the object with a hydraulic jacking unit of the present invention installed in a recess in the foundation, with parts of the jacking unit broken away.

Referring now to the drawings, and more particularly to FIG. 1, a heavy machine 1, such as a large piece of stationary mechanical equipment or the like, is shown resting on its foundation F. For example, object 1 may be a large industrial air compressor rated at 6,000 horsepower or more and weighing fifty to one hundred tons. Typically, these machines are secured to their foundations by a plurality (e.g., six are shown in FIG. 1) of anchor bolts 3 securely imbedded in foundation F. The latter may be a large monolithic mass of reinforced concrete weighing several times as much as the machine to be mounted thereon. As shown, the air compressor has a base 5 including support points or pads constituted by mounting flanges or feet 7 having bolt holes 9 therethrough for reception of respective anchor bolts 3. These mounting flanges are rigidly secured to the machine (e.g., they may be integrally cast with the machine frame). In mounting a large stationary machine, it is usually essential that it be precisely positioned and leveled. For example, the rolls of a rolling mill or the like must be positioned and leveled to be within 0.001 in. (0.025 mm.) of a desired position. For other machinery, such as an air compressor, it need not only be as accurately positioned, but is is essential that it be so supported on its base that its crankshaft is free of deflection. This may require trial and error adjustment of the mounting flanges 7 of the machine until the deflection of the crankshaft axis is elminated.

The method or system of this invention involves accurately positioning and supporting object or machine 1 on its foundation F. The method described below is a system for resetting objects previously mounted in a conventional manner which must be repositioned and remounted. However, it will be understood that the system of this invention may also be used to initially position an object on its foundation. In accordance with the method or system of this invention anchor bolts 3 are first unbolted to free the machine from its foundation F. As shown in FIG. 1, pockets or recesses 11 are formed in foundation F immediately below each mounting flange 7 of the machine. For previously installed machines, these recesses may be formed by jack-hammering away a portion of the foundation. For new installations, the concrete foundation may be poured with the recesses formed therein. Anchor bolts 3 extend up through these recesses. It will be understood that, when recesses 11 are formed, the anchor bolts remain solidly imbedded in the foundation. It will also be noted that with recesses 11 formed adjacent mounting flanges 7, base 5 of the machine is still supported on the foundation intermediate the recesses thereby making it unnecessary to lift or remove the machine from the foundation for resetting purposes.

A hydraulic jacking unit, as generally indicated at 13 (e.g., a hydraulically adjustable sole plate) is positioned in each recess 11 below a respective mounting flange 7. The bottom or recess 11 is cleared of loose concrete or other debris and is made relatively flat so as to provide a solid support for the jacking unit.

Figure 6:
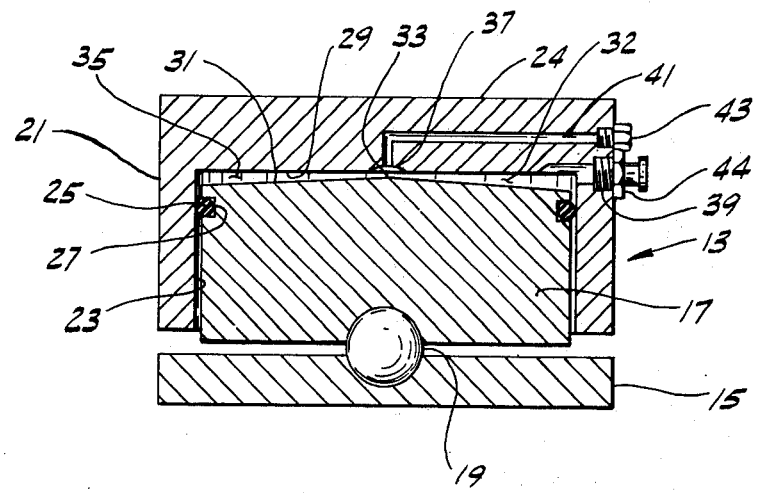
FIG. 6 is a vertical section of the jacking unit taken along line 6—6 of FIG. 5.

Referring now to FIG. 6 each jacking unit 13 is shown to comprise a base plate 15 which rests on the bottom of recess 11. A stationary piston 17 is pivotally secured to the upper face of base plate 15 by means of a ball swivel 19 which permits swiveling movement of the piston relative to the base plate about any axis. The jacking unit further includes a cylinder block 21 having a cylinder 23 therein for reception of piston 17. As indicated at 24, the upper face of cylinder block 21 is machined flat so as to insure uniform contact with mounting flanges 7 of machine 1.

Figure 5:
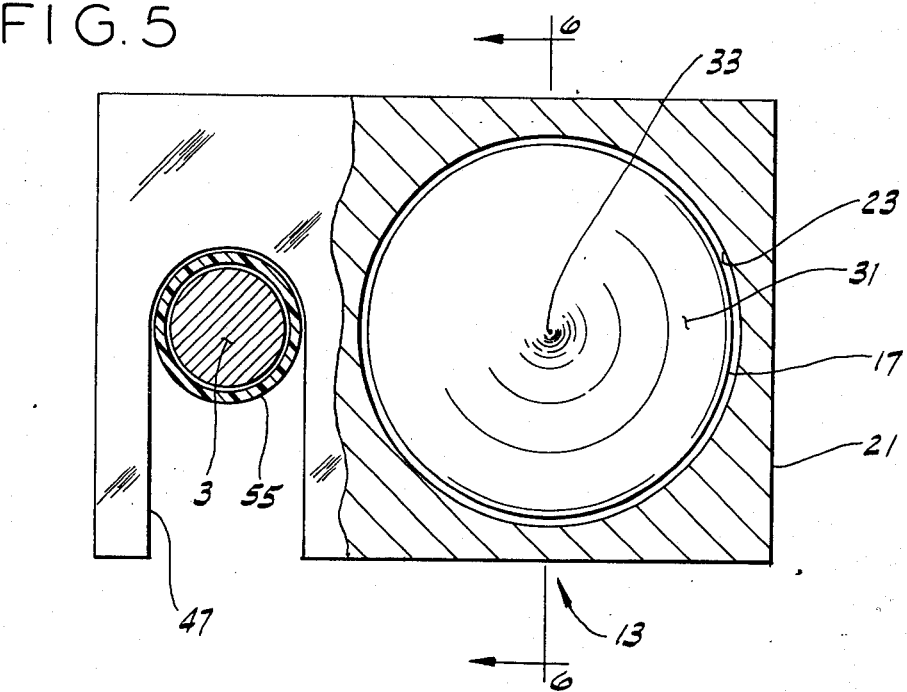
FIG. 5 is a plan view of a jacking unit of the present invention with a portion of its cylinder block broken away to illustrate a cylinder and piston therein.

Ball swivel 19 permits piston 17 and cylinder block 21 to be self-aligning with respect to base plate 15 so as to enable surface 24 to uniformly engage the bottom of mounting flange 7 with the base plate resting on the bottom of recess 11. Piston 17 has an O-ring seal 25 received in a circumferential groove 27 around its outer end, the seal providing a sliding, sealing fit between the walls of cylinder 23 and the piston. Cylinder 23 has an inner end face 29 and piston 17 has an outer end face 31, these faces being opposed to one another. The portion of cylinder 23 between piston face 31 and cylinder face 19 forms an expansible chamber 32 for purposes as will appear. Piston end face 31 protrudes out beyond the end of the piston with the outermost portion of the piston face, as indicated at 33, being at the center thereof. Specifically, piston face 31 is shown to be conical, however it will be understood that also may be dome-shaped. Piston and cylinder faces 31 and 29, respectively, are movable relative to one another between a retracted position in which the faces are closely spaced relative to one another and an extended position. With the piston and cylinder in their stated retracted positions, an annular space 35 surrounds the outermost portion 33 of piston face 31. Cylinder face 29 has a pocket recess 37 therein at the center thereof. Cylinder 23 has an inlet port 39 adjacent cylinder face 29 for the introduction of a hardenable liquid, as will be hereinafter specified, constituting a hydraulic working fluid, into chamber 32 for pressurizing cylinder face 29 and piston face 31 so as to effect relative extension of the cylinder and piston. Cylinder 23 also has an outlet port 41 in communication with pocket 37 for exit of air from chamber 32 as the hydraulic working fluid enters this chamber. Outlet port 41 is internally threaded for receiving a plug 43 to close the outlet port once air has been expelled from within chamber 32. A one-way valve fitting 44, such as a button-type high-pressure grease fitting with a ball-check valve incorporated therein, is installed in inlet port 39 so as to permit flow of liquid into chamber 32 and to prevent exit of the liquid therefrom. As shown in FIG. 1, hydraulic jacking unit 13 may be pressurized by a piston-type hand pump 45 having a flexible pressure hose 46 adapted to be snapped onto fitting 44 thereby to permit the flow of fluid into the jacking unit. Upon discontinuing pumping of pump 45, the fitting automatically closes and seals the jacking unit, entrapping the hydraulic fluid within the unit. As indicated at 47, in FIG. 5, cylinder block 21 may optionally have an open slot therein for partially surrounding a respective anchor bolt 3 thereby to insure that the jacking unit is held captive to and properly positioned with respect to the anchor bolt and to mounting flanges 7.

Figure 3:
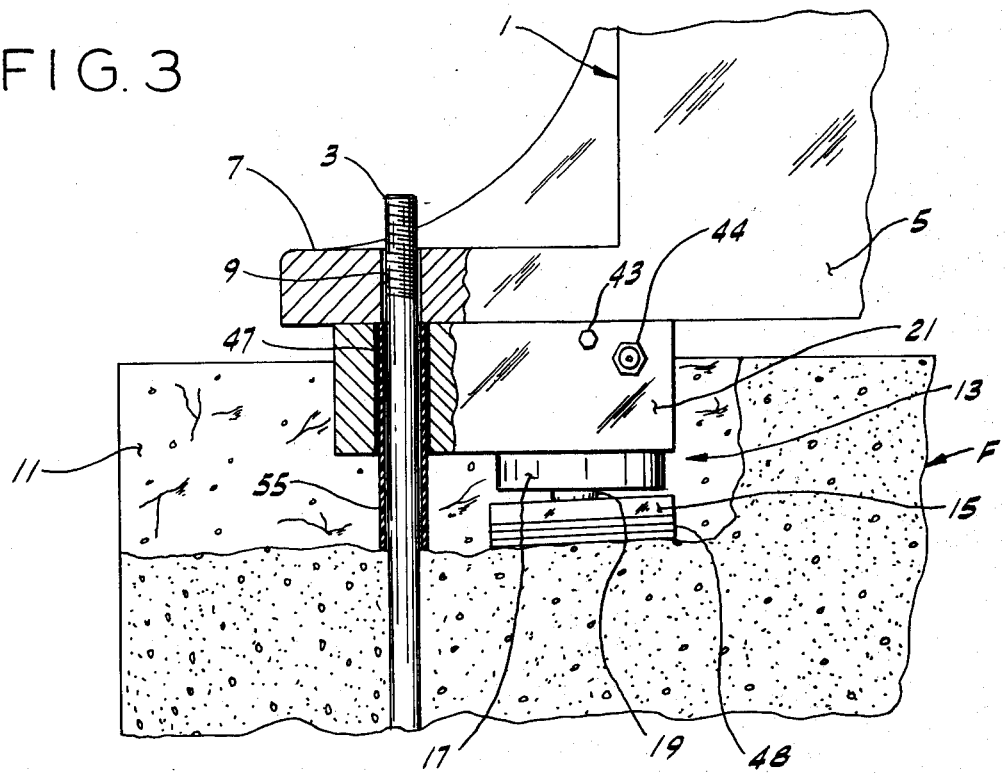
FIG. 3 is a view similar to FIG. 2, showing the jacking unit pressurized to lift the machine clear of the foundation, the distance the machine is lifted clear of the foundation being exaggerated for purposes of illustration.

With jacking units 13 in place in recesses 11, shims 48 may optionally be placed between base plate 15 and the bottom of the recess so as to bring the top surface 24 of the cylinder block 21 into contact with the bottom surface of a respective machine mounting flange 7. With all of the jacking units in place, a hardenable liquid, as hereinafter specified, is introduced into each jacking unit under pressure via its inlet port 39 and fitting 44 thereby to fill chamber 32 with liquid and to force all air within the chamber out of outlet 41. Pocket recess 37 formed in cylinder face 29 and the outwardly protruding piston end face 31 insure that liquid entering chamber 32 completely fills the chamber without forming voids therein and that all the air is exhausted from the chamber via outlet 41. When liquid flows out of outlet 41, the outlet port is capped by plug 43. The jacking unit is then pressurized by introducing more liquid into the chamber so as to effect relative movement of piston 17 and cylinder block 21 to lift machine 1 clear of its foundation F (see FIG. 3).

In accordance with the system or method of this invention, the liquid used to pressurize jacking units 13 is a hardenable liquid, such as a liquid epoxy resin mixed with a conventional catalyst or hardener. One such epoxy resin is commercially available under the trade designation "Escoweld 7505", sold by the Enjay Chemical Company of Houston, Tex. in which the volumetric ratio of resin to hardener or catalyst is about 2.5:1. At room temperature (i.e., at 77° F. or 25°C.) the blended resin has a viscosity ranging between 1100 and 1300 centipoises (Fann Model 35 viscometer), a density of 8.9 pounds/gallon 1.06 kg./l.), and a potlife of 50 minutes. By cooling the resin below 60°F., the pot life can be greatly extended. At 77°F. (25°C.), a 50 g. mass of blended resin will be 75% cured after 30 hours, while at 110°F. (43°C.), it will be 95% cured after 2 hours. The blended resin has an adhesive shear in compression (ASTM-D-905) of 2600 psi. It is particularly important that upon curing the resin has no appreciable expansion or contraction. Other suitable epoxy resins having similar properties are commercially available from Epoxy Technology Inc. of Watertown, Mass., and from Bonded Products, Inc. of Westchester, Pa. It will be understood that other types of synthetic resin materials, preferably thermosetting, which have generally similar properties and will change state from a liquid to a solid without significant expansion or contraction, may be used as the hydraulic fluid to pressurize the jacking units.

As previously mentioned, jacking units 13 may be pressurized by attaching pressure hose 46 from hand pump 45, for example (see FIG. 1), to fitting 44 and by pumping the hardenable epoxy resin into chamber 32. With outlet port 41 plugged by screw plug 43 after the air has been bled or removed from within chamber 32 in the manner heretofore specified, introduction of the liquid into the chamber causes cylinder block 21 to move relative to piston 17 away from the base plate 15 to lift and support machine 1. As previously mentioned, when hose 46 is removed from fitting 44, the latter automatically closes to entrap the liquid in the chamber and to maintain it under pressure so as to support the machine in a desired elevation or position. In this manner, each of the jacking units 13 is pressurized and extended so as to lift the entire machine clear of foundation F and clear of any previously poured grouting material thereon. For example, the machine is initially lifted 0.060–0.075 in. (1.5–1.9 mm.) in order to insure complete separation of the machine from the foundation. By requiring that the machine only need be lifted a relatively small distance, piping previously connected to machine 1 need not be disconnected and repositioned, thus saving considerable time in remounting a machine.

Typically, the selected position for the machine is above its above-described lifted or selected position in which the machine is clear of foundation F. To position the machine in its selected position, jacking units 3 at the center of the machine are first pressurized to lift the center of the machine to its selected position and the outer units are then appropriately pressurized. The selected position may be established by dial indicators 49 (see FIG. 1) attached to the frame of the machine which register the displacement of the machine relative to foundation F or to another stationary reference. For example, the desired location of the machine may be established by determining the distance each of the mounting flanges 7 must be elevated from its raised position so as to position a reference point on the machine at a desired level. Means other than dial indicators may, of course, be used to precisely locate and align machine 1. For example, targets may be placed on the machine and optical transits or other measuring instruments may be utilized to align these targets with a desired reference.

It will be understood that during positioning of the machine precise adjustment of each of the jacking pads is usually required. For example, a typical cylinder 23 in a jacking unit 13 may have a diameter of 5.000 in. (127 mm.), and hand pump 45 may be a conventional high-pressure (1500 psi) grease gun. For each full stroke of the hand pump, cylinder block 21 is moved 0.0005 in. (0.013 mm.). Thus, each of the jacking units may be precisely adjusted merely by stroking the hand pump. Upon obtaining a selected position for a jacking unit, hose 46 is removed from fitting 44 and the liquid will remain entrapped within chamber 32. The jacking units may be lowered by loosening plug 43 and allowing a quantity of the liquid to be vented from cylinder 23. Because of the ease which each of the jacking units may be adjusted to support the machine in its selected position, the system of this invention enables much more rapid and easy positioning of the machine. It will be understood that, for other jobs in which the object 1 to be repositioned is heavier or lighter, the diameter of piston 17 and cylinder 23 may be varied in accordance with the load each jacking unit 13 is required to support. Thus, the effective pressure area of the jacking units may be varied to as to increase the load it can lift while maintaining its working pressures within desired limits.

With machine 1 in its desired or selected position and with each of the jacking units 13 closed (i.e., hose 46 is removed from fitting 44, thus causing the fitting to instantly close, entrapping the hardenable liquid therewithin), the entrapped liquid is allowed to set for a time sufficient to effect the hardening of the liquids within the jacking units thereby to fix the jacking units in their respective selected positions with the machine supported in its selected position. Hardening of the liquid may be accelerated by elevating the temperature of the jacking units to approximately 110°F. (43°C.) so that the liquid will harden in approximately 2 hours. As the liquid exhibits no significant expansion or contraction upon hardening, object 1 remains in its selected position as the liquid hardens. The temperature of the liquid may be raised by shrouding the machine and introducing heated air into the shroud, or by locally heating each jacking unit.

Figure 4:
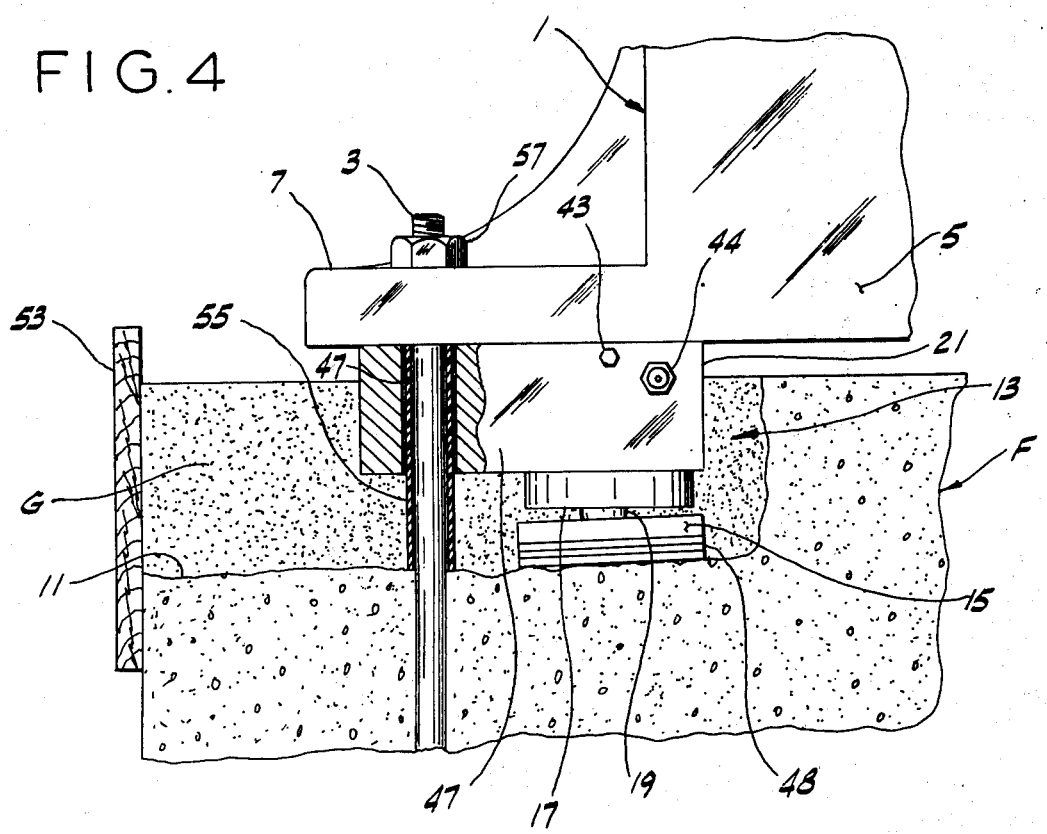
FIG. 4 is a view similar to FIGS. 2 and 3 showing the object positioned in its selected position with the jacking unit fixed to support the object and with the recess filled with grouting.

With machine 1 supported on foundation F by jacking units 13, recesses 11 in the foundation F are filled with a grouting mixture G which surrounds the jacking units to securely hold them in position on the foundation. While any of the customary grouts may be used, preferably an epoxy resin-hardener blend such as specified above, but containing an aggregate of fine white sand or the like, is utilized. A dam or form 53 (see FIG. 4) is placed across the outer opening of recesses 11 in the sides of foundation F. Prior to pouring the grouting mixture into the recesses, it is preferred that each anchor bolt be coated with a suitable release agent, such as paraffin wax, and surrounded by a sleeve 55 of rubber tubing or the like to shield the anchor bolt from the grouting mix and to prevent the latter from adhering thereto. The grouting mix is then poured in the recesses to surround the jacking unit and the shielded anchor bolt therein. This grouting mixture may be poured in recesses 11 as soon as the jacking units 13 have been adjusted to support the machine in its selected position. Thus, the grouting mixture may be hardened at the same time as the liquid within the jacking units is hardened. It will be noted that this saves considerable time.

In accordance with the system of this invention the entire weight of the machine is supported by jacking units 13 which bear solidly on foundation F, and the grout does not support any part of the machine weight.

With the object 1 supported by jacking units 13 and by the hardened liquid therewithin and with the grouting mix poured in recesses 11 hardened, nuts 57 are threaded an anchor bolts 3 and tightened in a sequence, as may be specified by the manufacturer of the machine being mounted, to a predetermined pre-load level thereby to secure the object on the foundation. With these anchor bolts preloaded under a specified tension load, machine 1 is prevented from moving relative to foundation F. It will be understood that jacking units 13 carry both the full weight of the machine and also the pre-load of the anchor bolts.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. The method of positioning and supporting an object, such as a large machine or other structure, on a foundation comprising the steps of:
    placing a plurality of hydraulic jack units between the foundation and the object;
    introducing a liquid under pressure into each of said jacking units to move the object relative to the foundation to a selected position, said liquid constituting a hydraulic working fluid and being hardenable to form a solid substantially without expanding or contracting as it hardens;
    maintaining said liquid in each of said jacking units under pressure so as to support said object in its selected position; and
    effecting the hardening of said liquid maintained in each of said jacking units to fix said jacking units in their respective positions with the object supported in its selected position.

2. The method of claim 1 which includes the further step of securing the object to the foundation after said object is supported in its selected position and the liquid has hardened.

3. The method of claim 2 wherein the step of securing the object to the foundation comprises bolting the object to the foundation immediately adjacent at least some of said jacking units thereby to prevent relative movement between the object and the foundation.

4. The method of claim 1 which further comprises closing each of said jacking units so as to entrap said liquid therewithin, said entrapped liquid supporting the object in its selected position, while the liquid hardens.

5. The method of claim 1 which further comprises the preliminary step of forming recesses in said foundation for reception of said jacking units.

6. The method of claim 5 which comprises the further step of introducing a hardenable grouting mix into said recesses to surround the jacking units with the latter in their fixed positions.

7. The method of claim 1 wherein said hydraulic fluid is an epoxy resin mixed with a suitable hardening agent or catalyst, and wherein said step of effecting hardening of said liquid comprises permitting said resin in said jacking units to stand for a sufficient time to permit said resin to harden.

8. The method of claim 7 which further comprises heating the resin within said jacking units so as to reduce the time required for the resin to harden.

9. The method of claim 1 which further comprises introducing said liquid into said jacking units to remove air from within, this last said step being done prior to pressurizing said jacking units for positioning said object.

10. The method of claim 9 wherein each of said jacking units has an inlet for the introduction of said liquid and an outlet for the exit of air and said liquid from within the jacking units, said inlet being located below the level of said outlet, and wherein said step of introducing liquid into each of said jacking units involves opening said outlet and introducing the liquid into the jacking unit via said inlet until the liquid flows out of said outlet thereby removing all air from within the jacking unit, and then closing the outlet.

11. The method of claim 6 wherein anchor bolts extend up from said recesses for securement to said object, said method further comprising the step of shielding the anchor bolts for preventing said grouting mix from adhering thereto.

* * * * *